Oct. 22, 1968   W. G. TRABOLD   3,407,395
CIRCUITRY TO INDICATE THE STATE OF A CORE
Filed April 28, 1964

INVENTOR.
William G. Trabold
BY
Hugh L. Fisher
ATTORNEY

United States Patent Office 3,407,395
Patented Oct. 22, 1968

3,407,395
CIRCUITRY TO INDICATE THE STATE OF A CORE
William G. Trabold, Royal Oak, Mich., assignor to General Motors Corporation, Detroit, Mich., a corporation of Delaware
Filed Apr. 28, 1964, Ser. No. 363,075
5 Claims. (Cl. 340—174)

ABSTRACT OF THE DISCLOSURE

The magnetic state of a highly remnant magnetic core is positively and continuously indicated by means of a bistable circuit connected to the output winding of the core and containing its own power supply. Bistable feature is accomplished by a tunnel diode regulated between high and low voltage states by flux changes in the core.

---

This invention relates to apparatus for determining the flux state of a closed magnetic circuit and, more particularly, to the combination of a core element of high hystersis material defining a closed flux path and a bistable device for providing a continuous indication of the flux state of the closed path.

Magnetic core devices are commonly used in switching circuits, logic circuits, information storage systems and other areas where a closed and reversible magnetic flux path is of advantage. By constructing the core of a high hysteresis material, each core affords two stable flux states of opposite character in which the device will remain indefinitely or until switched, by means of an input signal, to the other of the states. Where the opposite states are used for representing respective information values, the state of the core at any given time must be determinable. The prior art describes various means for determining the flux state of the core. In the case of a flux path having an air gap, it is possible to indicate the flux state by means of a Hall effect device inserted in the gap. However, where the magnetic path is necessarily closed, alternative methods must be employed. These alternative methods include, as a first example, a destructive readout in which the state of the flux path is determined by attempting to switch the flux in the path to a predetermined direction. If the flux is switched, an output signal in a sense line linking the core indicates that the device was in one of the stable states, and if the flux is not switched, the absence of the signal indicates that the device was and remains in the other of the stable states. In the event the state of the device is desired to be preserved, means must be provided for restoring the device to the original state. An example of a nondestructive readout method useable with multi-apertured devices includes the use of a small RF signal source connected to a primary winding which is used to sense the flux state of a minor flux path of the device. If the device is in one of the stable states, a secondary winding on the core is effectively coupled to the primary winding to energize a readout device such as a small lamp. However, if the device is in the other of the stable states, the primary and secondary windings are decoupled and the lamp is not energized.

In accordance with the present invention a constant and continuous indication of the flux state of a closed magnetic circuit is provided without the need for an RF source or the addition of minor flux paths to the circuit. In general this is accomplished by means of a combination of an output winding linking the flux path and responsive to flux reversals in the path to provide bipolar voltage pulses, the polarity of the individual pulses of which is determined by the direction of the flux reversal, and a bistable output device connected to the output winding for producing a continuous output signal of one character in response to positive voltage pulses and a continuous output signal of a second character in response to negative voltage pulses.

In a preferred embodiment of the invention, a tunnel diode, otherwise known as an "Esaki" diode, is connected to an output winding linking the flux path and is operable in a bistable mode to provide high and low voltage signals responsive to the bipolar voltage pulses produced in the output winding as a result of flux reversals in the magnetic path. As is well known to those skilled in the art, the tunnel diode is a semiconductor device exhibiting a non-linear current-voltage characteristic which allows the device to be operated in a bistable mode wherein the device may be placed in a high or low voltage state by means of appropriate biasing signals. Through the combination of a tunnel diode and a magnetic core device having an output winding linking the device and connected to the tunnel diode, it is possible to provide a continuous output from the diode of a discrete character which is an indication of the flux state of the core device.

The invention, as well as preferred apparatus for carrying the invention into effect, may be best understood by referring to the following specification which is to be taken with the accompanying drawings of which:

Figure 1:
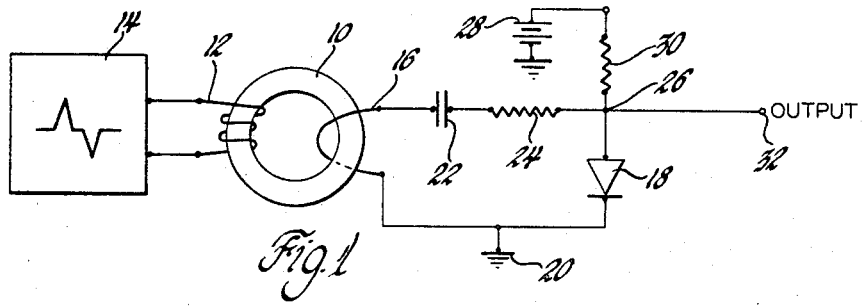
FIGURE 1 is a schematic circuit diagram of a first embodiment of the invention employing a tunnel diode connected in shunt relation with the output winding of a magnetic core device.

Referring now to FIGURE 1, this embodiment of the invention includes a magnetic core 10 of a substantially square loop hysteresis material, such as ferrite. The magnetic core 10 defines a closed flux path of high residual magnetism, which is to say that the flux induced in a particular direction in the core 10 is retained upon removal of the source inducing the flux. For controlling the direction of flux in the magnetic core 10, there is provided an input winding 12 which links the flux path defined by the core 10. The input winding 12 is connected to a source 14 which provides bipolar current pulses in the input winding 12 of sufficient magnitude to saturate the core 10 in either direction. It may be readily determined that the direction of residual magnetism or flux in the magnetic core 10 is determined by the polarity of the current signal produced in the input winding 12 by the source 14. For the purpose of determining the flux state in which the magnetic core 10 has been placed by the source 14, an output winding 16 links the flux path defined by the core 10. This output winding is shown as a single turn for purposes of illustration but may include more than one turn. As is well known to those skilled in the art, bipolar voltage pulses may be induced in the output winding 16 by flux reversals in the magnetic core 10. The particular polarity of the voltage pulse induced in the output winding 16 is, of course, determined by the direction of flux change or reversal in the core 10.

To determine at all times the flux state of the core 10, the bipolar voltage pulses which are induced in the output winding 16 as described above are applied to a bistable readout device in the form of a tunnel diode 18 which is connected in shunt relation with the winding 16. As shown in the drawings, one side of the output winding 16 and the cathode of the tunnel diode 18 are commonly connected to a point of reference potential shown as ground 20. The other side of the output winding 16 is connected through the series combination of a capacitor 22 and a resistor 24 to a circuit junction 26, which is in turn connected to the anode of the tunnel diode 18. A DC supply source indicated at 28 is connected through a resistor 30 to the circuit junction 26 to supply current to the tunnel diode. In addition, an output terminal 32 is connected to the circuit junction 26 for providing an output point for conveniently determining the voltage state of the diode 18.

Figure 2:
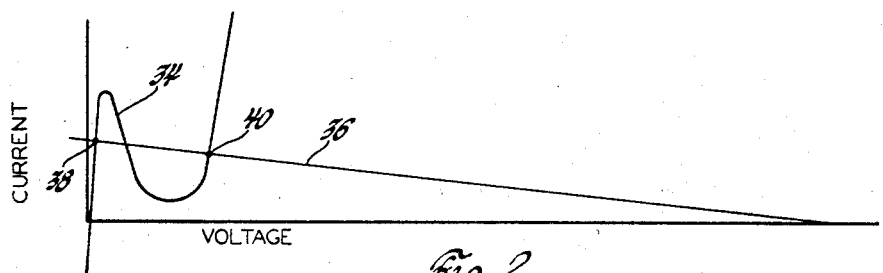
FIGURE 2 is a diagram of the current-voltage characteristic of a tunnel diode indicating the mode of operation of the diode as applied in the embodiment of FIGURE 1.

Referring now to FIGURE 2, there is shown a current-voltage characteristic for the tunnel diode 18 shown in FIGURE 1. The characteristic curve 34 exhibits the non-linearity which is familiar to those skilled in the art as representing a tunnel diode. A load line 36, as determined by the magnitude of the resistor 30 of FIGURE 1, is shown to intercept the tunnel diode characteristic 34 at points 38 and 40. The points 38 and 40 are two stable points of operation into which the diode 18 may be placed by means of appropriate input signals. As will be apparent to those skilled in the art, the resistor 30 is chosen so that the load line 36 intersects the characteristic curve 34 such that the point 38 determining the low voltage state and the point 40 determining the high voltage state of the tunnel diode 18 are as far removed from the tunnel diode peak and valley points as is practicable.

Describing the operation of the circuit shown in FIGURE 1, it may be assumed that the magnetic core 10 is initially saturated with flux in the counterclockwise direction and that the tunnel diode 18 is biased to the low voltage state represented by point 38. In this condition, a relatively low voltage appearing at output terminal 32 indicates that the core 10 is saturated in the counterclockwise direction. Upon the occurrence of a current pulse in the input winding 12 of such a polarity as tends to reverse the direction of flux in the core 10 from the counterclockwise to the clockwise direction, a positive voltage pulse with respect to ground is induced in the output winding 16. This positive voltage pulse causes a transient current to flow through the series combination of capacitor 22 and resistor 24 and into the tunnel diode 18. This current pulse is chosen to be of a sufficient magnitude to raise the tunnel diode current 18 from the low voltage point 38 beyond the peak current value indicated on the characteristic curve 34. The tunnel diode 18 is thereby switched to the high voltage state determined by point 40, thus, presenting a high output voltage at terminal 32 indicating that the magnetic core 10 is now saturated with flux in the clockwise direction. Since the high voltage point 40 of the tunnel diode 18 represents a stable state of operation, the diode 18 will be maintained in that state until the flux in core 10 is again reversed to the counterclockwise direction.

Upon the occurrence of a current pulse in input winding 12 from the source 14 of such a direction to switch the flux in the core 10 back from the clockwise to the counterclockwise direction, a negative voltage pulse with respect to ground is induced in the output winding 16. This output voltage pulse produces a transient current tending to decrease the net current through the diode 18 from the high voltage point 40 to a value less than the valley current indicated by the characteristic curve 34. The tunnel diode thus switches to the low voltage state determined by point 38. The tunnel diode 18 remains in the low voltage state until it is again switched by means of a flux reversal in the core 10.

Figure 3:
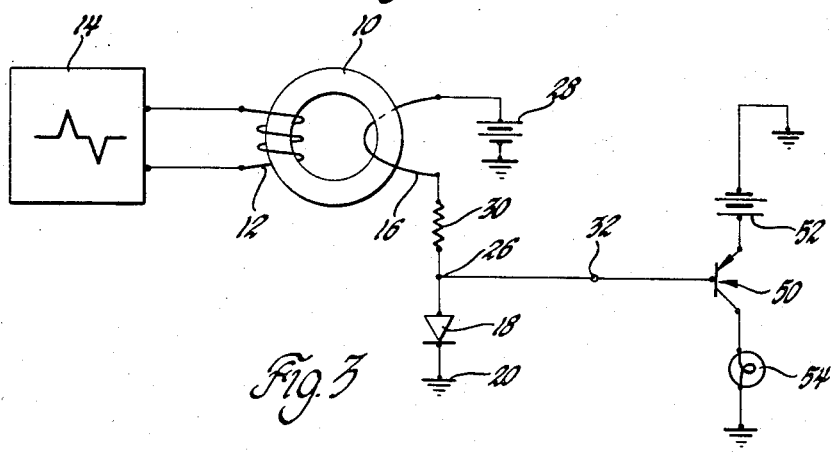
FIGURE 3 is a schematic diagram of a second embodiment of the invention employing a tunnel diode connected in series relation with the output winding of a magnetic core device.

Referring now to FIGURE 3, a series connected diode configuration is shown. In this circuit, the magnetic core 10 is again supplied with bipolar input current pulses from a source 14 by means of an input winding 12 linking the flux path defined by the core 10. An output winding 16 similarly links the magnetic path defined by the core 10. One side of the output winding 16 is connected to a positive DC supply source at 28 and the other side of the winding 16 is connected through a resistor 30 to a circuit junction 26. The circuit junction 26 is connected to the anode of a tunnel diode 18. The cathode of the diode is connected to ground 20 as shown. In addition, an output terminal 32 is electrically connected to the circuit junction 26 to provide an indication of the voltage state of the tunnel diode 18. Connected as shown, the output voltage pulses induced in the winding 16 by flux reversals in the core 10 are series connected to the tunnel diode 18 to affect the voltage state thereof.

Figure 4:
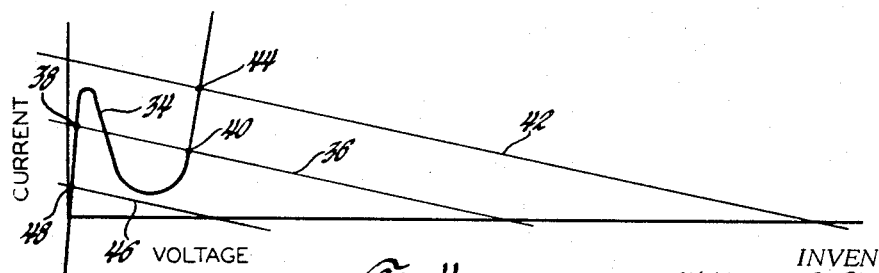
FIGURE 4 is a diagram of the current-voltage characteristic of a tunnel diode and the mode of operation of the diode as applied in the embodiment of FIGURE 3.

Referring to FIGURE 4, the tunnel diode characteristic curve 34 is intercepted by a load line 36 determined by the magnitude of resistor 30. The load line 36 intercepts the curve 34 at a low voltage point 38 and a high voltage point 40 as indicated. In addition, FIGURE 4 shows a high voltage load line 42 which intercepts the curve 34 at a high voltage point 44 and a low voltage load line 46 which intercepts the curve 34 at a low voltage point 48.

In operation, the core 10 of the circuit shown in FIGURE 3 is assumed to be initially saturated with flux in the counterclockwise direction and the tunnel diode 18 is assumed to be in the low voltage state represented by point 38. Upon the occurrence of a current pulse in input winding 12 from the source 14 tending to reverse the direction of flux in the core 10 to the clockwise direction, a transient voltage is induced in the output winding 16 in such a direction as to add to the bias voltage from the supply source 28. The induced voltage pulse shifts the load line from 36 to 42, thereby shifting the tunnel diode current to point 44. As the induced voltage decays to zero the load line shifts from 42 to 36, and the tunnel diode 18 is left in the high voltage state determined by point 40. A correspondingly high voltage output is provided at terminal 32 indicating that the flux in core 10 is saturated in the clockwise direction.

When the core 10 is switched by means of a current pulse in the input winding 12 from the clockwise to the counterclockwise direction of flux saturation, a transient voltage is induced in the output winding 16 in such a direction as to subtract from the voltage from the supply source 28. This voltage pulse shifts the load line from 36 to 46 and the tunnel diode current is shifted to point 48. As the induced voltage decays to zero, the diode voltage returns to the stable low voltage state represented by point 38. A correspondingly low voltage output is provided at terminal 32 indicating that the flux in the core 10 is saturated in the counterclockwise direction.

By means of the embodiments shown and described with reference to FIGURES 1 and 3, the flux condition in the path defined by the magnetic core 10 is continuously indicated by constant voltage output signals of either high or low amplitude respectively indicating counterclockwise and clockwise directions of flux saturation in the core 10. The output terminal 32 may, as shown in FIGURE 3, be coupled directly to the base of a germanium transistor 50 such that the circuit between a DC source 52 and lamp 54 is opened when the tunnel diode 18 is in the low voltage state and is closed when the tunnel diode 18 is in the high voltage state.

It is to be understood that while the present invention has ben described with reference to a specific embodiment thereof, the description is not to be construed in a limiting sense. For a definition of the invention, reference should be made to the appended claims.

What is claimed is:
1. In combination, a magnetic core element of high hysteresis material defining a closed flux path, an input winding linking the flux path and adapted to receive signals for switching the direction of flux in the path, an output winding linking the flux path and responsive to flux reversals therein to provide bipolar voltage pulses, the polarity of the individual pulses of which corresponds with the direction of the flux reversal causing the pulse, and bistable output means connected to the output winding for producing a continuous output signal of a first character in response to a positive voltage pulse and a continuous output signal of a second character in response to a negative voltage pulse said output means including a power supply providing direct energy to sustain said continuous output signals.

2. Apparatus as defined in claim 1 wherein said bistable output means is a tunnel diode having high and low voltage states of a stable nature, and a direct current supply source connected to the tunnel diode for supplying current thereto.

3. In combination, a magnetic core element of high hysteresis material defining a closed flux path, an input winding linking the flux path and adapted to receive signals for switching the direction of flux therein, an output winding linking the flux path and responsive to flux reversal in said path to provide bipolar voltages, the polarity of the individual pulses of which corresponds with the direction of the flux reversal producing the individual pulse, a tunnel diode having high and low voltage states of a stable nature connected in shunt relation with the output winding and responsive to said voltage pulses to assume one of the stable states as determined by the polarity of the voltage pulse, and a source of electrical energy connected to the tunnel diode.

4. In combination, a magnetic core element of high hysteresis material defining a closed flux path, an input winding linking the flux path and adapted to receive signals for switching the direction of flux therein, an output winding linking the flux path and responsive to flux reversal in said path to provide bipolar voltages, the polarity of the individual pulses of which corresponds with the direction of the flux reversal producing the individual pulse, a tunnel diode having high and low voltage states of a stable nature connected in series with the output winding and responsive to said voltage pulses to assume one of the stable states as determined by the polarity of the voltage pulse, and a source of electrical energy connected in series with the diode and the output winding.

5. Apparatus as defined in claim 4 including output circuit means connected to the diode for producing an output signal of a character corresponding with the voltage state of said diode.

References Cited

UNITED STATES PATENTS

| | | | |
|---|---|---|---|
| 3,125,685 | 3/1964 | Tiemann | 307—88 |
| 3,198,955 | 8/1965 | Schaeffer | 307—88 |
| 3,281,802 | 10/1966 | McMahon | 340—174 |
| 3,289,185 | 11/1966 | Crane et al. | 340—174 |
| 3,343,146 | 9/1967 | Walker | 340—174 |

BERNARD KONICK, *Primary Examiner.*

V. P. CANNEY, *Assistant Examiner.*